(12) United States Patent
Vashishtha et al.

(10) Patent No.: US 10,019,648 B2
(45) Date of Patent: Jul. 10, 2018

(54) IMAGE CLASSIFICATION BASED ON CAMERA-TO-OBJECT DISTANCE

(71) Applicant: Adobe Systems Incorporated, San Jose, CA (US)

(72) Inventors: Samartha Vashishtha, Noida (IN); Vikrant Rai, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 57 days.

(21) Appl. No.: 14/964,334

(22) Filed: Dec. 9, 2015

(65) Prior Publication Data
US 2017/0169570 A1 Jun. 15, 2017

(51) Int. Cl.
| | |
|---|---|
| *G06K 9/00* | (2006.01) |
| *G06K 9/62* | (2006.01) |
| *G06T 7/536* | (2017.01) |
| *G06K 9/46* | (2006.01) |
| *G06T 7/00* | (2017.01) |

(52) U.S. Cl.
CPC ....... *G06K 9/6215* (2013.01); *G06K 9/00604* (2013.01); *G06K 9/00664* (2013.01); *G06K 9/4604* (2013.01); *G06K 9/4633* (2013.01); *G06T 7/00* (2013.01); *G06T 7/536* (2017.01); *G06K 9/00248* (2013.01); *G06T 2207/30201* (2013.01)

(58) Field of Classification Search
CPC ............. G06K 9/00248; G06K 9/6215; G06K 9/00604; G06K 9/0061; G06K 9/00664; G06K 9/4604; G06K 9/4633; G06K 9/627; G06K 9/6284; G06T 2207/30201; G06T 2207/20004; G06T 2207/30244; G06T 7/00; G06T 7/0044; G06T 7/536
See application file for complete search history.

(56) References Cited

U.S. PATENT DOCUMENTS

| | | | | |
|---|---|---|---|---|
| 6,091,899 | A | * | 7/2000 | Konishi ................. G03B 13/02 396/51 |
| 7,389,041 | B2 | | 6/2008 | Gindele et al. |
| 8,000,505 | B2 | | 8/2011 | Gallagher |

(Continued)

OTHER PUBLICATIONS

"Top 5 Apps for Stable, Clear Selfie Photos from Smartphone Rear Camera", Retrieved at: http://gadgetstouse.com/featured/take-selfie-using-rear-camera/34665 on Oct. 23, 2015, 2 pages.

(Continued)

*Primary Examiner* — Tom Y Lu
(74) *Attorney, Agent, or Firm* — Wolfe-SBMC

(57) ABSTRACT

Image classification based on a calculated camera-to-object distance is described. The camera-to-object distance is calculated based in part on a ratio of a measured dimension of an identified feature in the digital image compared to a known physical dimension of the identified feature in real life. A human anatomical constant, such as a dimension of the human eye, may be used as the feature to calculate the camera-to-object distance. The camera-to-object distance can be used to classify the digital image, such as by determining whether the image is a selfie. The camera-to-object distance may also be used for image editing operations to be performed on the digital image.

20 Claims, 10 Drawing Sheets

(56) References Cited

U.S. PATENT DOCUMENTS

2002/0093515 A1\* 7/2002 Fay ..................... G01B 11/00
　　　　　　　　　　　　　　　　　　　　345/629
2013/0057573 A1\* 3/2013 Chakravarthula ...... G06F 3/005
　　　　　　　　　　　　　　　　　　　　345/619

OTHER PUBLICATIONS

Thainimit,"Iris Surface Deformation and Normalization", 13th International Symposium on Communications and Information Technologies (ISCIT), 2013, 2013, 6 pages.

\* cited by examiner

IMAGE CLASSIFICATION BASED ON CAMERA-TO-OBJECT DISTANCE

BACKGROUND

Improvements to digital cameras have been developed to increase functionality provided by the digital cameras and support usage scenarios in innumerable settings and circumstances. One increasingly popular usage scenario for digital cameras is capturing "selfies." Selfies refer to a self-portrait photographs, typically taken with a digital camera or camera phone held in the hand or supported by a selfie stick, or sometimes by pointing the camera at a mirror. Since users often share selfies with friends on social media and otherwise utilize selfies in different ways than other types of images, users may be interested in identifying selfies and separating selfies from the other types of images (such as in different folders). Unfortunately, traditional digital camera and images editing tools provide limited tools for identifying and working with selfies. Consequently, users who are interested in locating and organizing selfies must manually search the images to find selfies and then edit image metadata to categorize images or set-up different folders for selfies and other image categories. Doing this can be quite time consuming and frustrating for the users.

Some mobile devices exist that can separate images taken with a front-facing camera into folders reserved for selfies. However, these categorization techniques are hardware based, and do not use vision algorithms to detect faces. Therefore, any image taken with the front-facing camera will be stored in the selfie folder, regardless of whether the image is a selfie or not. This leaves users with images taken with a front-facing camera in the selfie folder that are not selfies, along with images taken with a rear-facing camera that are selfies which are not placed in the selfie folder. These errors compound frustration for users who wish to accurately categorize the images they have taken.

SUMMARY

Techniques to classify images based on calculated camera-to-object distance are described. In one or more implementations, an image processing application obtains a digital image for processing. A reference feature contained in the digital image, such as a human eye, is identified, and sizes for one or more dimensions of the feature within the image are measured, such as in pixels. The reference feature has physical dimensions of known sizes in real life (e.g., millimeters, inches, feet, etc.), and the known size of the reference feature is used as a reference constant for computations. For example, at least one measured dimension of the reference feature is compared to the known physical dimensions. Using this comparison, a camera-to-object distance can be computed according to a camera-to-object distance formula and image editing operations may be selectively applied to the image based in part upon the camera-to-object distance. Additionally, the camera-to-object distance can be used to determine whether the image is a selfie, and otherwise categorize the images based on the camera-to-object distance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
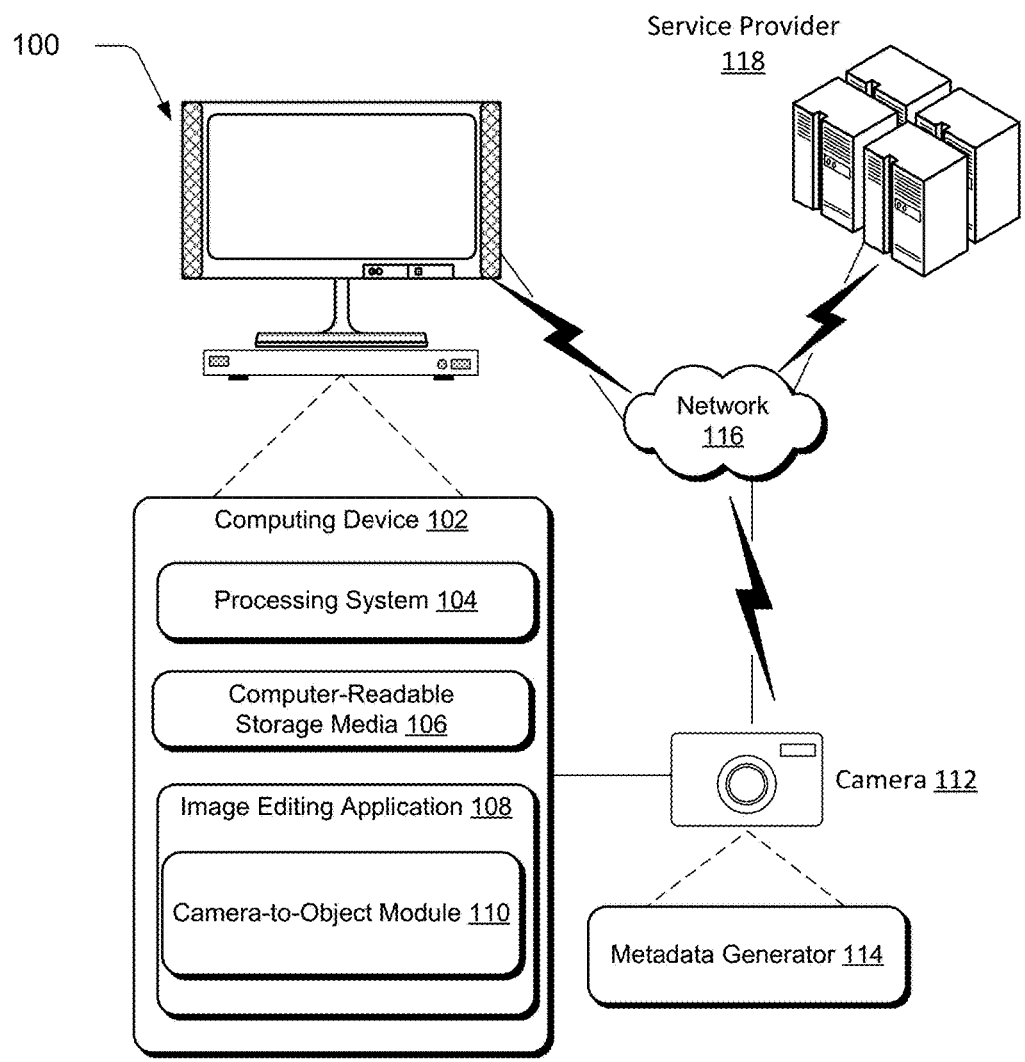
FIG. 1 illustrates an example operating environment in accordance with one or more implementations.

Self-portrait photographs referred to as "Selfies" are increasingly popular in the digital imaging world. Unfortunately, traditional digital cameras and image editing tools provide limited tools for identifying and working with selfies. Users may manually associate metadata tags indicating an image is a selfie and set-up different folders for different categories of images, but this process is time consuming and inconvenient. Although digital cameras may currently associate some metadata with images, traditional metadata appended to images does not include selfie categorizations or parameters sufficient to make distinctions between selfies and other types of images.

Techniques are described herein to use optical geometry and known sizes of reference objects in real-life to categorize images in a corpus of digital images. In one embodiment, the described techniques are used to distinguish selfies from other types of images and automatically categorize images accordingly. In one or more implementations, the techniques involve determining camera-to-object distance (CTO) for images using human anatomical constants, such as dimensions of the human eye as discussed just below. The computed camera-to-object distances are used to categorize images and to selectively apply image editing operations on the images. As used herein, CTO describes the distance from the camera to a particular object captured in the image.

Reference features with known dimensions in real life are used to compute the CTO. A reference feature is an object that can be captured in a digital image that has a known size in real life. When humans are captured in images, reference features corresponding to the human body can be associated with known human anatomical constants. An example of a human anatomical constant is dimension of the human eye. The sizes of various aspects of the human eye are substantially constant for all humans and have little variance with age and ethnicity, which makes the human eye a reliable candidate as a reference feature with known, real-life dimensions. Specifically, the horizontal visible iris diameter (HVID) and the transverse diameter of the human eye are used as human anatomical constants in various implementations.

To compute camera-to-object distance, at least one measured dimension of a reference feature detected within the digital image is compared to the known physical dimensions established for the reference feature as a constant value. Using this comparison, a camera-to-object distance can be computed according to a camera-to-object distance formula. Comparison of the measured dimension to the known dimension in real life, along with additional parameters related to the captured digital image such as focal length, height of the digital image, and sensor height of the camera yields an accurate camera-to-object distance. Generally, the camera-to-object distance formula relies upon a ratio of the known dimension in real to the measured dimension of the reference feature. The camera-to-object distance formula is configured to reflect the notion that camera-to-object distance depends upon this ratio and the focal length of the camera. In order to obtain values of the camera-to-object distance in particular units, a conversion factor may also be applied. One example of a conversion factor that may be used is the height of the image divided by the sensor height of the camera that captured the image. Further details regarding CTO computations and implementations of the camera-to-object distance formula are discussed in relation to FIG. 3.

Once the camera-to-object distance has been calculated, the calculated value can be used to identify selfies in a corpus of digital images and categorize images accordingly. The information derived from the image may also be used to selectively control image editing operations. For example, camera-to-object distance and selfie categorization may be used to selectively apply operations such as lens correction, removal of unwanted elements, perspective control, enhancement, sharpening and softening, and merging images, to name a few, on a respective image. Additionally, images may be automatically grouped and arranged in a file system according to selfie categorizations and camera-to-object distance, such as having a dedicated folder or tab for images identified as selfies.

Techniques for image classification and camera-to-object distance computations as described herein may be employed to quickly and accurately classify images based on CTO with little or no user involvement. This may include automatically recognizing selfies and handling selfies differently than other types of images. For example, users may be presented with a folder containing images already categorized as selfies, and apply image editing operations to all of the images in the folder as a group without having to locate selfie images amongst other images and manually apply image editing operations to each image. Additionally, the calculated camera-to-object distance may be computed to within an accuracy of a few millimeters using the described techniques, which may in turn enhance image editing operations applied to the images. Further, constant dimensions for the human eye or other reference features may be used to calculate camera-to-object distances and sizes of other elements within an image. This may be used to adaptively learn new reference features and expand a collection of reference features available for CTO computations over time.

In the discussion that follows, a section titled "Operating Environment" is provided that describes one example environment in which one or more implementations can be employed. Following this, a section titled "Image Classification Based on Camera-To-Object Distance" describes example details and procedures in accordance with one or more implementations. Last, a section titled "Example System" describes example computing systems, components, and devices that can be utilized for one or more implementations of using human anatomical constants to identify selfies in a corpus of digital images.

Operating Environment

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, and an image editing application that resides on the computer-readable media and which is executable by the processing system. The processing system 104 may be configured to include multiple independent processors configured in parallel or in series and one or more multi-core processing units. A multi-core processing unit may have two or more processors ("cores") included on the same chip or integrated circuit. In one or more implementations, the processing system 104 may include multiple processing cores that provide a range of performance capabilities, processing efficiencies, and power usage characteristics.

The processing system 104 may retrieve and execute computer-program instructions from the image editing application 108 and other applications of the computing device (not pictured) to provide a wide range of functionality to the computing device 102, including but not limited to gaming, office productivity, email, media management, printing, networking, web-browsing, and so forth. As noted above and below, the computing device 102 may comprise a camera or "smart" camera, which may or may not be enabled to execute these applications, depending on the capabilities of the device. A variety of data and program files related to the applications can also be included, examples of which include games files, office documents, multimedia files, emails, data files, web pages, user profile and/or preference data, and so forth.

The computer-readable media 106 can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 9.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 1, the computing device 102 can be implemented as a computer that is connected to a display device to display media content. Alternatively, the computing device 102 may be any type of portable computer, mobile phone, or portable device that includes an integrated display. The computing device 102 may also be configured as a wearable device that is designed to be worn by, attached to, carried by, or otherwise transported by a user. Any of the computing devices can be implemented with various components, such as one or more processors and memory devices, as well as with any combination of differing components. One example of the computing device 102 is shown and described below in relation to FIG. 9.

A camera 112 is shown as being communicatively coupled to the computing device 102. The camera 112 may be configured as a standalone camera, such as a compact camera, action camera, bridge camera, mirrorless interchangeable-lens camera, modular camera, digital single-lens reflex (DSLR) camera, or digital single-lens translucent (DSLT) camera, to name a few. Additionally or alternatively, the camera 112 may be integrated into the computing device 102, such as in the case of built-in cameras in mobile phones, tablets, PDAs, laptop computers, and desktop computer monitors, for example. Additionally or alternatively, the computing device 102 may itself be a camera, for example a "smart" digital camera, and may comprise one or more of the processing system 104, computer-readable storage media 106, image editing application 108, and camera-to-object module 110. Other embodiments of the structures of the computing device 102 and the camera 112 are also contemplated.

The communicative coupling of the camera 112 to the computing device 102 may occur through one or more of a PC serial port, a USB port, wireless connections such as Bluetooth or Wi-Fi, to name a few. Operating systems of computing devices, such as the computing device 102, may allow for automatic upload of images via network 116 to service provider 118. Alternatively or additionally, the communicative coupling may comprise the use of a cellular network, such as a multimedia messaging service.

The camera 112 may also include metadata generator 114. Metadata generator 114 is representative of functionality to embed metadata parameters in images captured by the camera 112. The metadata parameters embedded by metadata generator may associate various fields with images taken by the camera 112. Examples of fields which may be associated with the camera 112 and contained within metadata include aperture, brightness, date and time the original image was created, flash status, exposure time, and focal length, to name a few. One example of a format for metadata to be embedded in digital images that can be output by metadata generator 114 is EXIF (exchangeable image file format) data. Metadata generator 114 is configured to generate aspects of EXIF metadata to include with a digital image accordingly, some embodiments of which can be found in the discussion of FIG. 3.

The computing device 102 may also include image editing application 108 and camera-to-object module 110 that operate as described above and below. The image editing application 108 and the camera-to-object module 110 may be provided using any suitable combination of hardware, software, firmware, and/or logic devices. As illustrated, the image editing application 108 and the camera-to-object module 110 may be configured as modules or devices separate from the operating system and other components. In addition or alternatively, the camera-to-object module 110 may also be configured as a module that is combined with the operating system of the computing device, or implemented via a controller, logic device or other component of the image editing application 108 as illustrated.

The camera-to-object module 110, also referred to as CTO module 110, represents functionality operable to calculate camera-to-object distance for a digital image which may be received from the camera 112. In order to calculate the camera-to-object distance, CTO module 110 may be configured to detect reference objects having known dimensions in the digital image. One example of a reference object having known dimensions in real life are human eyes, although other reference objects may be used that have known dimensions in real life. CTO module 110 may further be configured to compare the measurement of the reference object to a known physical dimension of the reference object. This comparison may take into account other parameters contained in metadata or constants associated with the digital image. CTO module 110 may use this comparison to determine a camera-to-object distance for the digital image. Alternatively or additionally, CTO module 110 may receive the camera-to-object distance from another application of the computing device 102, or from the camera 112.

When CTO module 110 obtains a camera-to-object distance associated with the digital image, CTO module 110 may be further configured to determine, based upon the camera-to-object distance, whether the image is a selfie. Determining whether the digital image is a selfie may be performed in any suitable way, examples of which can be found in relation to FIGS. 7 and 8. Alternatively or additionally, CTO module 110 may receive an indication that the digital image is a selfie, and may then use known parameters, such as physical dimensions of the human eye and outstretched arm, to determine a camera-to-object distance for the digital image. In any case, once it is determined that the digital image is a selfie and/or a camera-to-object distance is calculated, these considerations may be used by image editing application 108 to perform image editing operations, examples of which are provided above and below. Details regarding these and other aspects of classifying images based on calculated camera-to-object distance are discussed in the following section.

The environment 100 further depicts that the computing device 102 and the camera 112 may be communicatively coupled via network 116 to a service provider 118, which enables the computing device 102 and the camera 112 to access and interact with various resources made available by the service provider 118. The resources made available by service provider 118 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

While environment 100 depicts both the computing device 102 and the camera 112 communicatively coupled to network 116, embodiments are also contemplated in which only one of these devices is communicatively coupled to network 116. As described above and below, the camera 112 may be integrated with the computing device 102, such as in the case of a smart phone, resulting in a single point of communication for both the computing device 102 and the camera 112 with network 116 via the computing device 102. Alternatively or additionally, the computing device 102 may be integrated with the camera 112, such as in the case of a "smart" camera, resulting in a single point of communication with network 116 via the camera 112. Other embodiments are also contemplated, with single or multiple points of communication between the computing device 102, the camera 112, and network 116.

Having described an example operating environment, consider now example details and techniques associated with one or more implementations of classifying images based on calculated camera-to-object distance.

Image Classification Based on Camera-to-Object Distance

To further illustrate, consider the discussion in this section of example devices, components, procedures, and implementation details that may be utilized to classify images based on calculated camera-to-object distance as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Device

Figure 2:
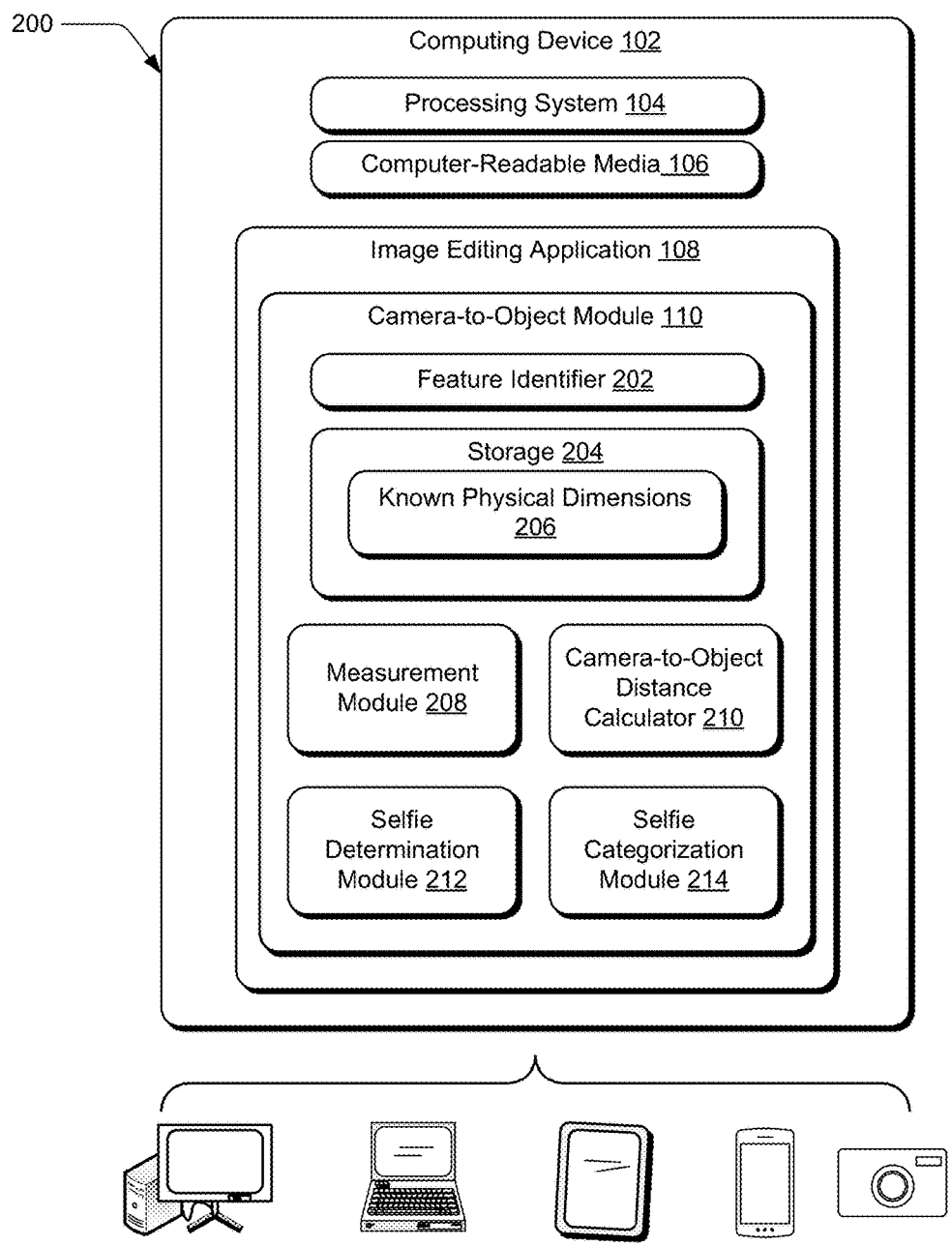
FIG. 2 is a diagram depicting example details of a computing device having an image editing application with a camera-to-object module in accordance with one or more implementations.

FIG. 2 generally at 200 depicts example details of a computing device 102 having an image editing application 108 with CTO module 110 in accordance with one or more implementations. The computing device 102 also includes processing system 104 and computer-readable media 106 as discussed in relation to FIG. 1. In the depicted example, a CTO module 110 is also shown as being implemented as a component of image editing application 108. CTO module 110 may be implemented as a separate standalone module, or combined with another application of the computing device 102, or another separate computing device.

By way of example and not limitation, CTO module 110 is depicted as having feature identifier 202, which is representative of functionality to identify features within digital images. Identifying features in digital images may be performed in any suitable way. For example, features in digital images may be identified using edge detection, corner detection, thresholding, template matching, or Hough transform, to name a few. Feature identification methods may also be combined in order to identify features within digital images. The feature identification may additionally involve facial recognition techniques to recognize human faces and individual body parts such as eyes of individuals in a photo.

CTO module 110 is also depicted as having storage 204, which is configured to store known physical dimensions 206 of real-life objects. One example of known physical dimensions that can be stored by CTO module 110 are constants established for the human eye, such as the horizontal visible iris diameter (HVID) and the transverse diameter of the human eye. Such constants are described in more detail in relation to FIG. 4. Other known physical dimensions 206 related to human anatomy which may be employed for the techniques described herein include, but are not limited to, ratios of facial features, ratios for two or more body parts, a default arm length, an arm length relating to a particular user, dimensions relating to a particular user's other facial features, and dimensions relating to selfie sticks. Further, known physical dimensions are not limited to individual values and accordingly ranges of physical dimensions are also contemplated. As noted, techniques comparable to using aspects of the human eye may be implemented using various types of reference features or objects having known sizes. Thus, any known physical dimension or range of dimensions of real-life objects that are detectable within images may be stored by storage 206, and the techniques described herein are not limited to using aspects of the human eye.

CTO module 110 is further depicted as having measurement module 208. Upon receiving a digital image and identifying one or more reference features within the digital image, CTO module 110 may be configured to invoke a measurement module 208 to measure the one or more features within the digital image in pixels. Measuring features within the digital image may be performed in any suitable way, some examples of which can be found in relation to FIGS. 3 and 4.

Additionally, CTO module 110 is depicted as having a camera-to-object distance calculator 210, also referred to as CTO calculator 210. CTO calculator 210 may use the known physical dimensions 206 stored in storage 204 along with the one or more measurements of features by the measurement module 208 to determine a camera-to-object distance for the digital image. CTO module 110 may then use the calculated camera-to-object distance to identify selfies and group selfies using selfie determination module 212. Selfie determination module 212 is representative of functionality to determine whether a digital image is a selfie. CTO module 110 may also include selfie categorization module 214, which may be configured to categorize images in various classifications according to calculated camera-to-object distance and indications regarding whether or not images are selfies.

In operation, a feature is identified by feature identifier 202. The feature corresponds to a defined reference feature that has known physical dimensions in real life, such as known physical dimensions 206 stored in storage 204. The identified feature is measured by measurement module 208, this measurement reflecting a digital size of the identified feature. CTO calculator 210 then calculates a camera-to-object distance for the digital image based in part on a ratio of the dimension measured by measurement module 208 of the identified feature and the known physical dimensions 206 corresponding to the identified feature. When a camera-to-object distance is calculated, selfie determination module 212 compares the camera-to-object distance to a threshold to determine if the digital image is a selfie. This threshold may be stored as a known physical dimension 206. CTO module 110 may also further categorize the digital image using selfie categorization module 214 based on various classifications, examples of which are provided above and below.

Calculating Camera-to-Object Distance

Figure 3:
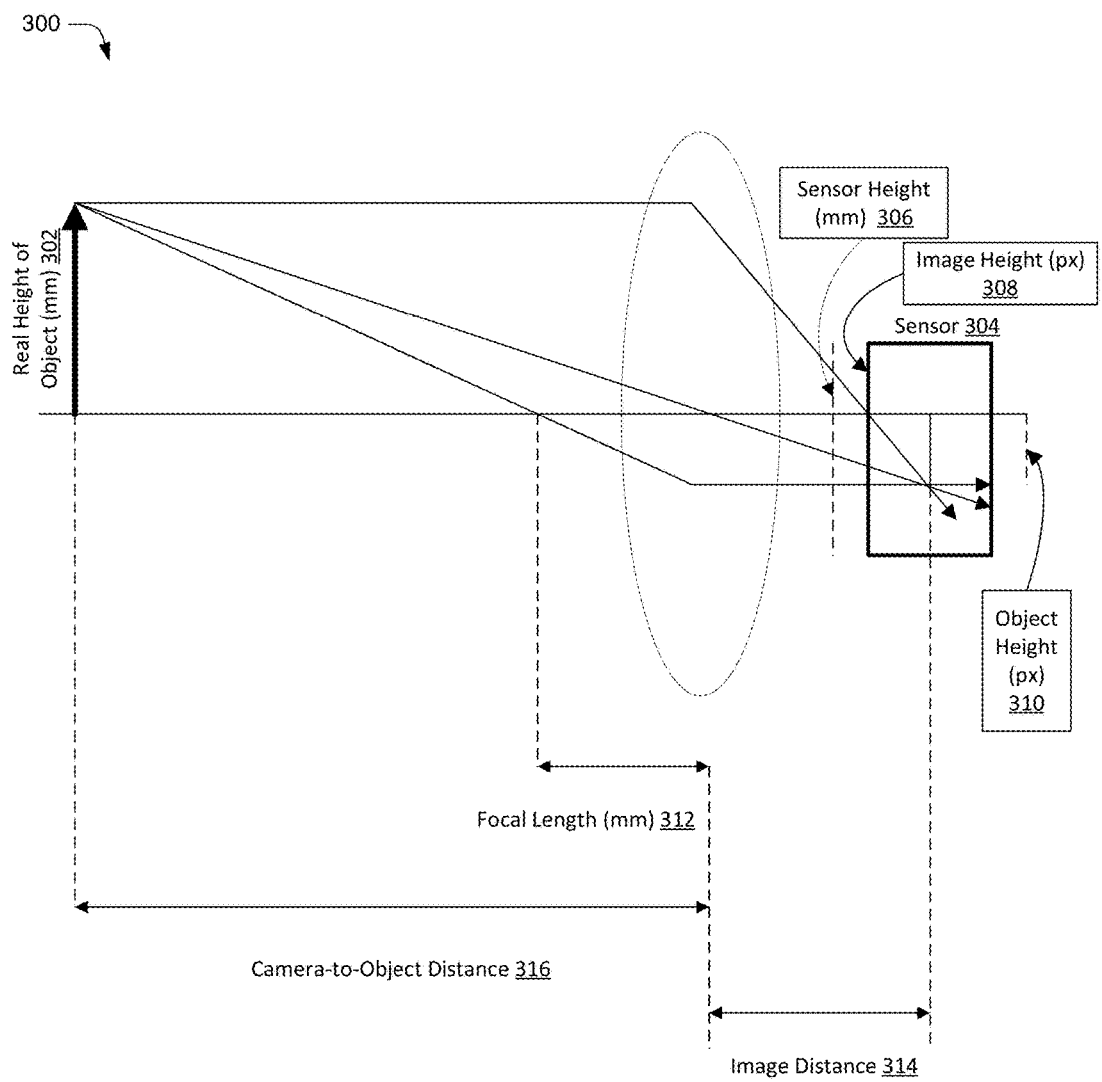
FIG. 3 is a diagram depicting aspects of optical geometry associated with a camera in accordance with one or more implementations.

Turning now to FIG. 3, which depicts generally at 300 a representation of geometric relationships that may be used to calculate a camera-to-object distance. The camera-to-object computation represented in FIG. 3 relies upon the geometric notion of similar triangles. Generally, a camera-to-object distance can be calculated based on a ratio of a known real height of an object compared to a measured dimension of the object in the digital image, along with a focal length of the camera that captured the digital image. In particular, the ratio of the size of the object in real life to the size of the object in the image is the same as the ratio between the focal length and camera-to-object distance. A conversion factor may be employed depending upon the units available for input values and the units desired for CTO. For instance, as represented in FIG. 3, the height of the digital image in pixels divided by the sensor height in millimeters may be used as a conversion in some implementations to obtain a camera-to-object distance in millimeters when the object height is measured in pixels and the real height is known in millimeters. Other formulas and conversion factors to determine a camera-to-object distance are also contemplated.

In one or more implementations, camera-to-object distance is determined by Equation 1 below, which is based on the diagram depicted in FIG. 3:

$$\text{Camera to object distance (mm)} = \frac{\text{Focal length (mm)} \times \text{Real height of object (mm)} \times \text{Image height } (px)}{\text{Object height } (px) \times \text{Sensor height (mm)}} \quad \text{Equation 1}$$

In this example, CTO is computed by multiplying the focal length by the ratio (real height/object height) and the conversion factor (image height/sensor height). Parameters found in Equation 1 may be obtained directly or indirectly from metadata associated with the image, which may be associated with images by metadata generator 114. The focal length 312 is commonly contained as part of the metadata associated with a digital image. Image height 308 is also commonly contained as part of the metadata associated with the image, as well as camera information provided by manufacturers. Additionally, sensor height 306 of sensor 304 may be provided by the manufacturer of the camera, but may also be computed indirectly from metadata data using the following formula:

$$\text{Sensor height (in)} = \frac{\text{Sensor vertical resolution } (px)}{\text{Focal Plane vertical resolution } (dpi)} \quad \text{Equation 2}$$

The sensor height obtained in Equation 2 may be converted into millimeters for use in Equation 1. Other conversions may be applied if the sensor height is provided by metadata generator 114 of the camera 112 in other formats. In any case, various parameters involved in computing CTO may be extracted or derived from metadata this is associated with an image when the image is taken. Additionally, available parameters such as camera type and model may be used in some instances to look-up parameters that are not directly available from metadata associated with an image. This may occur by referencing a local table/database, querying a service that provides a repository of camera/digital imaging data, or otherwise.

As noted, the object height 310 corresponds to the dimensions of the one or more measured reference features obtained by measurement module 208. Object height 310 is computable using imaging software such as Photoshop™, Lightroom™, and others using built-in measurement capabilities, such as the Ruler tool in Photoshop™. While Photoshop™ and Lightroom™ are provided as examples for ways to measure object height 310, these examples are in no way limiting, and any suitable means to measure an object height may be used without departing from the scope of the invention.

Observe from Equation 1 that a known real height of an object 302 is used to compute the camera-to-object distance 316. This real height 302 should be a reasonably constant value. By way of example and not limitation, two real-life dimensions which are reasonably constant across ages and ethnicities are the human iris diameter and the transverse diameter of the human eye. Accordingly, these features of human eyes (and other anatomical constants) may be used in various implementations described herein. Additional discussion of using the human iris diameter and the transverse diameter of the human eye as anatomical constants for the real height of an object can be found in the discussion of FIGS. 5-7.

Figure 4:
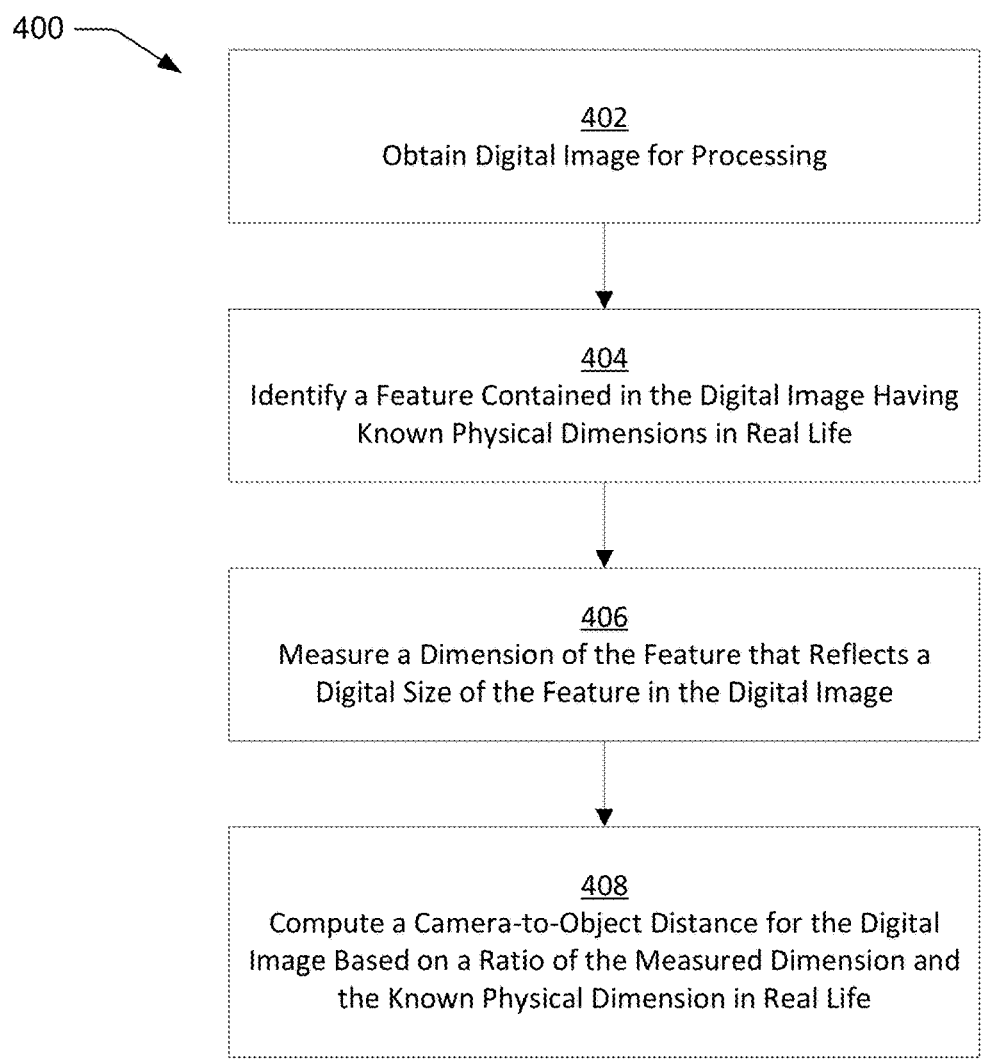
FIG. 4 is a flow diagram that describes details of an example procedure for computing camera-to-object distance in accordance with one or more implementations.

Referring now to FIG. 4, a flow diagram is depicted for an example procedure 400 in which optical geometry and constants associated with known real-life dimensions are employed to calculate a camera-to-object distance. The procedure 400 can be implemented by way of a suitably configured computing device, such as by way of image editing application 108, CTO module 110, and/or other functionality described in relation to the examples of FIGS. 1-3 and/or 5-6. Individual operations and details discussed in relation to procedure 400 may also be combined in various ways with operations and details discussed herein in relation to the example procedures of FIGS. 7 and 8.

A digital image is obtained for processing (block 402). Digital images may be obtained in a number of ways according to the device that captured the image and the device that will process the image, examples of which are provided above. For instance, a digital image may be captured on a compact digital camera, followed by a computing device obtaining the digital image for processing. Another example involves capturing the image using a smartphone camera, where the smartphone is configured to perform the processing of the digital image via corresponding hardware and software. Other examples of obtaining a digital image for processing are also contemplated, such as transferring images to a device via from a flash drive, hard drive, optical disk, or other media, downloading images from cloud based storage, accessing images from a service such as Adobe Stock™, and so forth.

A feature having known physical dimensions in real life is identified in the digital image (block 404). The feature may be identified using edge detection, corner detection, thresholding, template matching, or Hough transform, to name a few. Feature detection may also involve facial recognition to identify humans, human faces, eyes, and other body parts of humans within images. Feature identification methods may also be combined in order to identify features within digital images. Other examples of feature identification are provided in the discussion of FIG. 2. Identifying a feature may also include determining if the feature lies along an axis of a two-dimensional Cartesian system relative to the digital image. Examples of features having known physical dimensions in real life include, but are not limited to, features of the human eye including the iris diameter and the transverse diameter of the eye.

A dimension of the feature that reflects a digital size of the feature in the digital image is measured (block 406). The dimension may be measured manually by a user, such as by using the Ruler tool in Photoshop™. In other embodiments, measurement of the dimension is performed automatically, such as using built-in functionality of an image editing application 108. If it is determined that the feature does not lie along an axis of a two-dimensional Cartesian system relative to the digital image, such as described in block 404, the measurement may be calculated as a Pythagorean hypotenuse of a projected right triangle associated with the dimension of the feature. Further description of using a Pythagorean hypotenuse of a projected right triangle associated with the dimension of the feature may be found in the discussion of FIG. 6. In implementations, the dimension of the feature is measured in pixels; however, other units of measurement may be used for the dimension of the feature.

Then, a camera-to-object distance is calculated based on a ratio of the measured dimension and the known physical dimension in real life (block 408). The camera-to-object distance calculation may involve application of a suitable camera-to-object distance formula, examples of which are described above and below. The computation may be based on the ratio as well as a focal length of the camera, an image height of the digital image in pixels, a sensor height of the camera, and/or other parameters, as noted herein. The focal length of the camera, the image height of the digital image, the sensor height of the camera, and any other parameters used to calculate the camera-to-object distance may be obtained from metadata embedded with the digital image when the image is captured.

Once the camera-to-object distance is calculated, this distance may be used in numerous ways. In some implementations, the camera-to-object distance is compared to a threshold distance(s) established to facilitate categorization of images into categories. This may include categorization of images as selfies and non-selfies. In addition or alternatively, the camera-to-object distance may be used to select or adapt image editing operations associated with the digital image based on the calculated CTO. Various other uses for the camera-to-object distance are contemplated, examples of which are provided above and below.

Having discussed details regarding calculations for camera-to-object distance, consider now details of techniques in which optical geometry and human anatomical constants are used to identify selfies in a corpus of digital images as described in relation to the examples of FIGS. 5-9.

Figure 5:
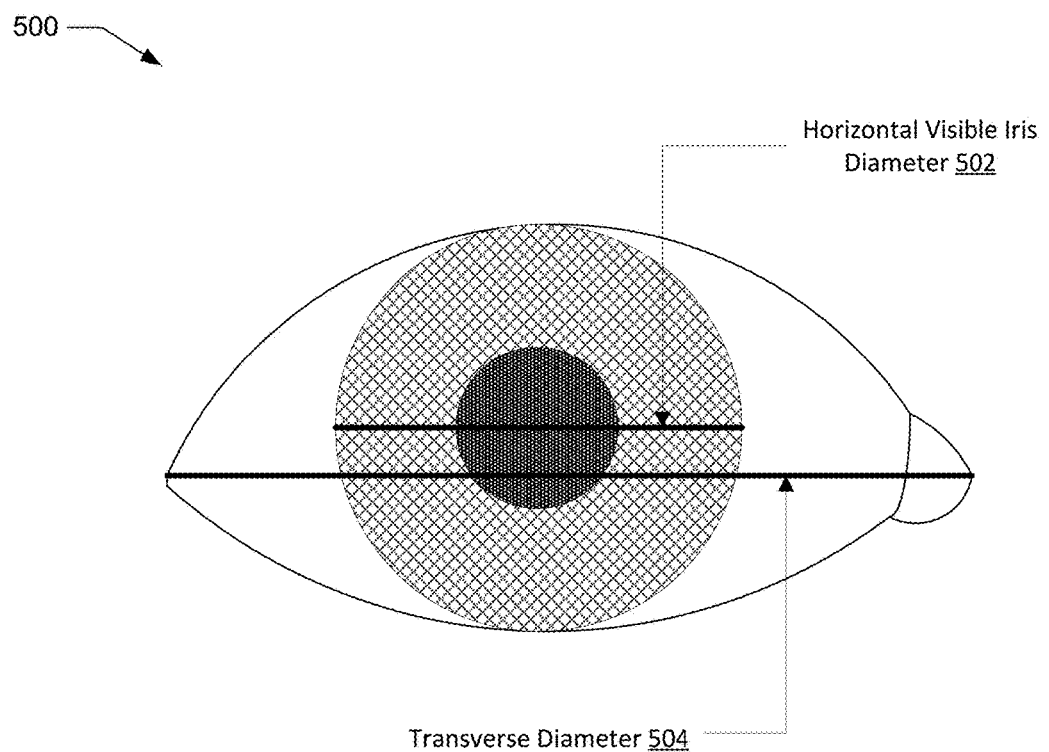
FIG. 5 illustrates dimensions of a human eye in accordance with one or more implementations.

Using Optical Geometry and Human Anatomical Constants to Identify Selfies in a Corpus of Digital Images Turning now to FIG. 5, a human eye is depicted generally at 500, having horizontal visible iris diameter 502, or HVID 502, and transverse diameter 504. HVID is a parameter commonly used in ophthalmology, and its value of approximately 11.8 mm is applicable to a majority of human subjects. The variance from this average value in human subjects is minimal, making it a reliable indicator for measuring camera-to-object distance. Accordingly, HVID 502 may be substituted into Equation 1, as it is a reliable and measurable object having a substantially constant value with little variation. Replacing Real height of object (mm) in Equation 1 with the established constant of 11.8 mm results in Equation 3, below:

$$\text{Camera to object distance (mm)} = \frac{\text{Focal length (mm)} \times 11.8 \text{ mm} \times \text{Image height } (px)}{\text{Object height } (px) \times \text{Sensor height (mm)}}. \quad \text{Equation 3}$$

Per Equation 3, camera-to-object distance can be calculated using a ratio of the established constant of 11.8 mm for the HVID compared to a measured value of an iris diameter found in a digital image—the object height in pixels. To compute CTO, the ratio is multiplied by the focal length as noted previously. This result is multiplied by an image height divided by the sensor height associated with the camera, which is a conversion factor to convert the camera-to-object distance to particular units (e.g., millimeters in the example equation). The ratio is derived from the known constant and measurement of the reference feature in the image. The additional factors included in the camera-to-object distance formula may be obtained directly from metadata embedded with the digital image, or in other ways as described herein.

Figure 6:
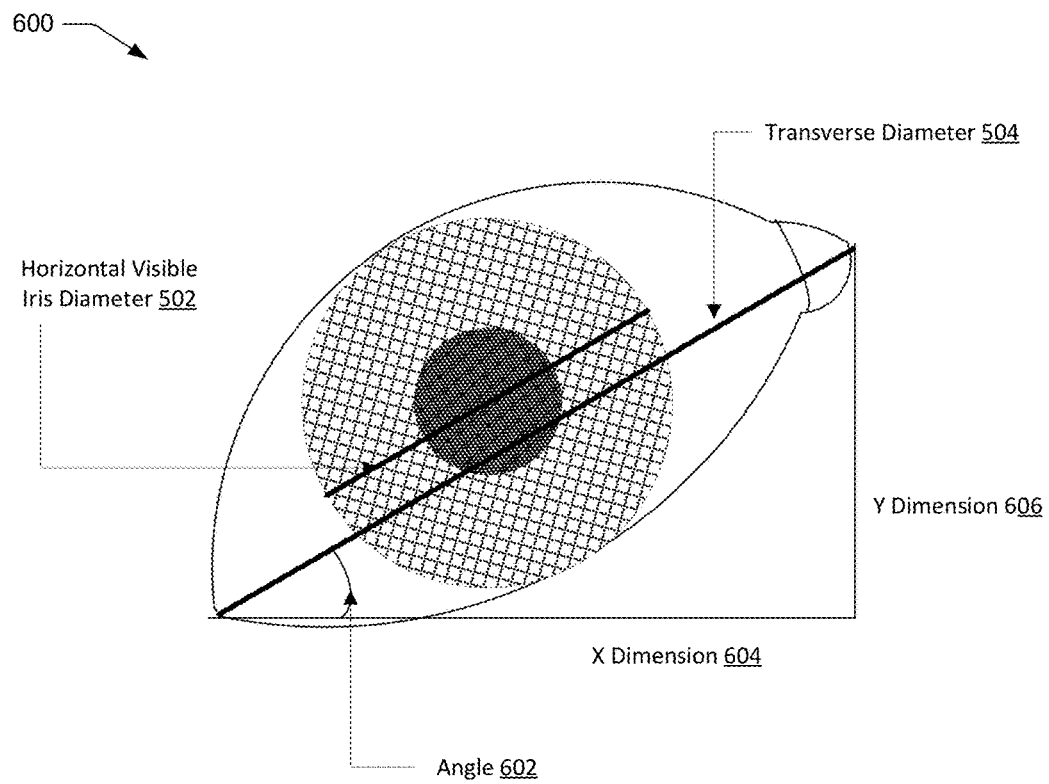
FIG. 6 illustrates dimensions of an angled human eye in accordance with one or more implementations.

FIG. 6, depicts generally at 600 another instance of a human eye which may be detected in a digital image analyzed by CTO module 110. In particular, FIG. 6 represents techniques for determining the dimension of a reference feature when the relevant dimension does not lie along one of the axes of the two-dimensional Cartesian system. In this situation, the dimension may be computed as the Pythagorean hypotenuse of a projected right triangle according to the Pythagorean theorem. Measurement when the relevant dimension aligns with the two-dimensional Cartesian system is straightforward.

In this context, FIG. 6 depicts an example projected right triangle having angle 602, X dimension 604 (x), and Y dimension 606 (y) forming a hypotenuse (h) which correspond to the transverse diameter 404 of the eye. Accordingly, the size of the hypotenuse (h) can be determined by applying the Pythagorean theorem (e.g., $h^2=x^2+y^2$). Although measurement of the transverse diameter 504 as the Pythagorean hypotenuse is illustrated in FIG. 6, comparable techniques may be employed for measurements of HVID and other reference features.

As noted, HVID is one illustrative example of a parameter usable to compute camera-to-object distance and identify selfies. HVID is available for digital images in which human subjects are captured with their eyes open and therefor the iris is visible. Naturally, for pictures of subjects with their eyes shut, HVID is not available and a different reference feature is selected in these scenarios. By way of example and not limitation, the transverse diameter of the human eye may be used for images of subjects with closed eyes, further discussion of which may be found in relation to FIG. 7.

Figure 7:
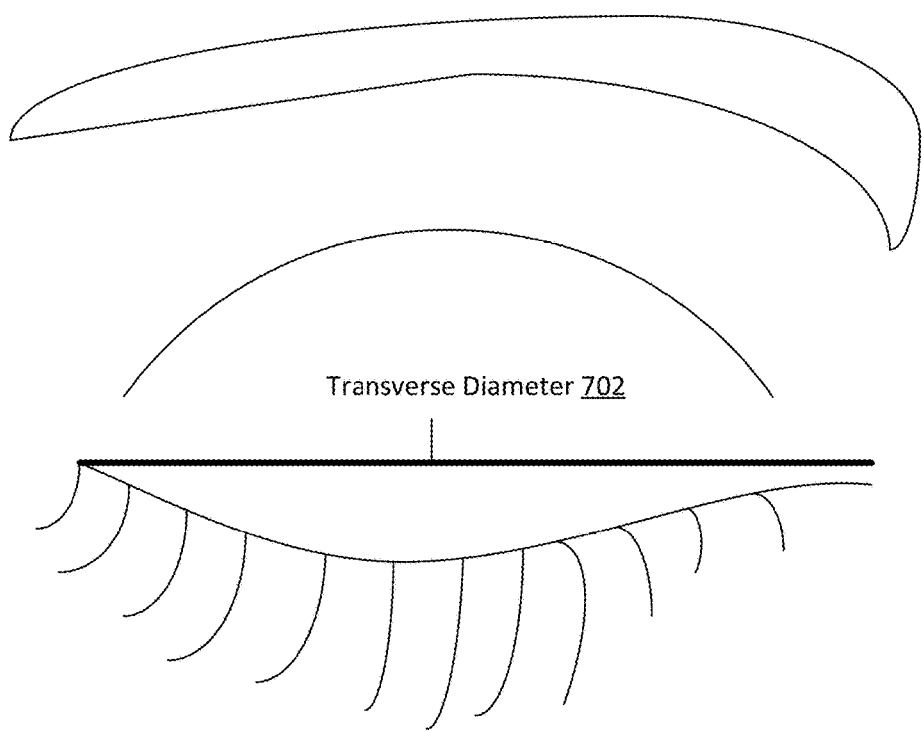
FIG. 7 illustrates dimensions of a closed human eye in accordance with one or more implementations.

FIG. 7 depicts generally at 700 a closed human eye having transverse diameter 702 in accordance with one or more implementations. The width of the human eye, otherwise known as the transverse diameter, is another substantially constant in adult humans across ethnicities at approximately 24.2 mm and also shows little variation in size across ages. The transverse diameter of the human eye—from the lacrimal sac to the other extremity of the eyelid—can be measured if the human subject has his or her eyes shut in a digital image. Therefore, in digital images of human subjects with their eyes shut, the transverse diameter may be utilized for object height 310 in Equation 1.

The transverse diameter may be measured using built in functionality of an image processing module. Similar to the discussion above, if the transverse diameter does not lie along one of the axes in the two-dimensional Cartesian system, it may be computed as the Pythagorean hypotenuse of a projected right triangle using the Pythagorean Theorem as discussed in relation to FIG. 6. Otherwise, the measurement when the transverse diameter aligns with the two-dimensional Cartesian system is straightforward.

Replacing Real height of object (mm) in Equation 1 with the values of 24.2 mm for the length of the transverse diameter results in Equation 4, below:

$$\text{Camera to object distance (mm)} = \frac{\text{Focal length (mm)} \times 24.2 \text{ mm} \times \text{Image height } (px)}{\text{Object height } (px) \times \text{Sensor height (mm)}}. \quad \text{Equation 4}$$

Per Equation 4, camera-to-object distance can be calculated using a ratio of the established constant of 24.2 mm for the transverse diameter compared to a measured value of the transverse diameter in a digital image—the object height in pixels. To compute CTO, this ratio is multiplied by the focal length and a conversion is applied as noted previously.

In accordance with the foregoing discussion, CTO calculator 210 may calculate camera-to-object distance for a digital image in various ways using different detected features and corresponding camera-to-object distance formulas such as the examples and equations discussed above. In general, camera-to-object distance formulas for different reference objects may be derived to compute camera to object distance based in part upon a ratio for the real-life size of a reference feature to a size of the feature measured within a digital image. When the human eye is used as the reference object, the computation may rely upon either or both of the HVID or transverse diameter of the human eye. The constants corresponding to real-life sizes of reference features may be configurable by the computing device manufacturer, and may be updated to include additional constants or update values of existing constants. Furthermore, the constants may be considered as ranges corresponding to ranges of real-life sizes of reference objects, resulting in ranges of camera-to-object distance. Further examples of using ranges to calculate camera-to-object distance can be found in the discussion of FIG. 8.

For instance, known image parameters derived from metadata associated with an image may be used along with a ratio of the measured object height 310 to known dimensions 206 for either HVID or transverse diameter of the human eye. If a human iris is identified by feature identifier 202, the HVID may be measured by measurement module 208. CTO calculator 210 may then use Equation 3 containing the established physical dimension for HVID to calculate a camera-to-object distance for the digital image. On the other hand, in situations in which the HVID is not available (e.g., eyes closed), the transverse diameter may be identified by feature identifier 202 and measured by measurement module 208. CTO calculator 210 then uses Equation 4 containing the established physical dimension for transverse diameter to calculate a camera-to-object distance for the digital image. Alternatively or additionally, CTO calculator 210 may calculate camera-to-object distance using a ratio of a measured object height 310 to known dimensions of various other features identified in a digital image, examples of which are provided above. CTO module 110 may then use the calculated camera-to-object distance to identify selfies and group selfies using selfie determination module 212.

In particular, CTO module 110 may include selfie determination module 212 as noted above, which is representative of functionality to determine whether a digital image is a selfie. Selfies are usually taken at arm's length with the subject directly looking at the camera. Therefore, eyes are often visible in selfies without much perspective distortion. The camera-to-object distance is typically within the length of a human arm (unless a selfie stick or other helper device is used). Consequently, a threshold value corresponding to arm length may be established and used to distinguish selfies from other images. Therefore, a selfie may be defined as an image with one or more human faces taken from a distance less than or equal to a threshold length established for the human arm.

By way of example and not limitation, a standard "arm's length" of 700 mm may be used as a threshold in some implementations. Here, the value of 700 mm corresponds to an upper bound established for human arm length. In this case, images having a CTO distance under 700 mm are categorized as selfies, whereas images having CTO distance above 700 mm are not considered selfies. More generally, selfie determination module 212 may compare a camera-to-object distance computed by CTO module 210 to an established threshold. If the camera-to-object distance is less than the threshold, then selfie determination module 212 may determine that the digital image is a selfie. However, if the camera-to-object distance is greater than the threshold, selfie determination module may determine that the digital image is not a selfie. Various distances for a threshold to determine whether a digital image is a selfie are contemplated, including but not limited to thresholds selected based on user-specific characteristics of users such as age, gender, or personalized dimensions of a particular user. The thresholds may also be configurable such that users are able to selected from among different default values and/or establish custom thresholds to tune selfie recognitions and image categorization behavior.

While selfie determination module 212 is described as part of image editing application 108 of the computing device 102, implementations are also considered where selfie determination module 212 exists on a remote server or cloud drive. One example of a remote location at which selfie determination module can take place is service provider 118. In these implementations, determining whether an image is a selfie occurs at the remote server or cloud drive, after the digital image is received at the remote server or cloud drive.

Again referring to FIG. 2, CTO module 110 may include selfie categorization module 214, which may be configured to categorize selfies based on various classifications. For example, group selfies typically have multiple discernible sets of eyes. A group selfie may be defined as an image with multiple human faces taken from a distance less than or equal to the threshold length established for the human arm. If multiple sets of eyes are identified by feature identifier 202, selfie categorization module 214 may categorize the digital image as a "group selfie." Further, if identified as a group selfie, measurements from the different sets of eyes could be used for error correction in calculating camera-to-object distance or to correct errors within the digital image itself.

A group selfie identification may also be used to determine the nature of the digital image with greater accuracy, examples of which are described above and below. In addition, in a digital image where one or more of the subjects is wearing glasses, a group selfie determination may assist in choosing a subject that is not wearing glasses for image editing operations or calculating camera-to-object distance. Choosing a subject that is not wearing glasses may prevent lens-caused biases that can occur with subjects wearing glasses.

Multiple eyes in a digital image may provide a more accurate sense of whether an image is a selfie. When multiple sets of eyes are captured in a digital image, a number of different approaches may be used either independently or in combination. First, a largest-sized eye in the digital image, measured in pixels, may be used to determine the camera-to-object distance for the digital image. Alternatively or additionally, a mean, median, or other appropriate statistical measure of the measured eye sizes may be considered to determine the camera-to-object distance for the digital image. Another option may be to determine which subject is the photographer of the digital image using arm positioning or other means. Measurements for the determined photographer's eyes can then be used to determine the camera-to-object distance for the digital image.

Categorization module 214 may also be configured to categorize images as selfies by identifying images which were taken with a selfie stick. Analytical means may be used to assess whether a selfie stick is being used. A user may also be prompted to confirm the use of the selfie stick, and set the length of the selfie stick in some scenarios. A user may also set preferences in advance to specify settings for selfie thresholds, selfie stick usage, images categorizations, and so forth. In implementations, metadata generator 114 of the camera 112 can generate a parameter indicating that a selfie stick is being used. This selfie-stick parameter may be used to override the threshold used in selfie determination module 212 and instead use an established threshold for selfie stick usage.

Additionally, categorization module 214 may be configured to categorize selfies based on various factors. The categorization may include grouping and organizing images in different categories based on CTO values that indicate how close subjects in the image were to the camera that captured the digital image. By way of example and not limitation, selfies may be categorized as close selfies, mid-range selfies, and long-range selfies, etc. Various threshold for these and other different categories may be defined. By way of example and not limitation, close selfies may correspond to digital images with a determined camera-to-object distance of up to 250 mm, mid-range selfies may correspond to digital images with a determined camera-to-object distance of 250 mm to 500 mm, and long-range selfies may correspond to digital images with a determined camera-to-object distance of 500 mm to 700 mm. After categorization module 214 has categorized a selfie, image editing application 108 may use this categorization to organize images and further fine-tune image editing operations as noted above. Selfie categorization module 214 is described as part of image editing application 108 of the computing device 102; however, selfie categorization module may exist on a remote server or cloud drive and provide categorization functionality after a digital image is received at the remote server or cloud drive. Details regarding these and other aspects of classifying images based on calculated camera-to-object distance are described in relation to the following example procedures.

Example Procedures

Figure 8:
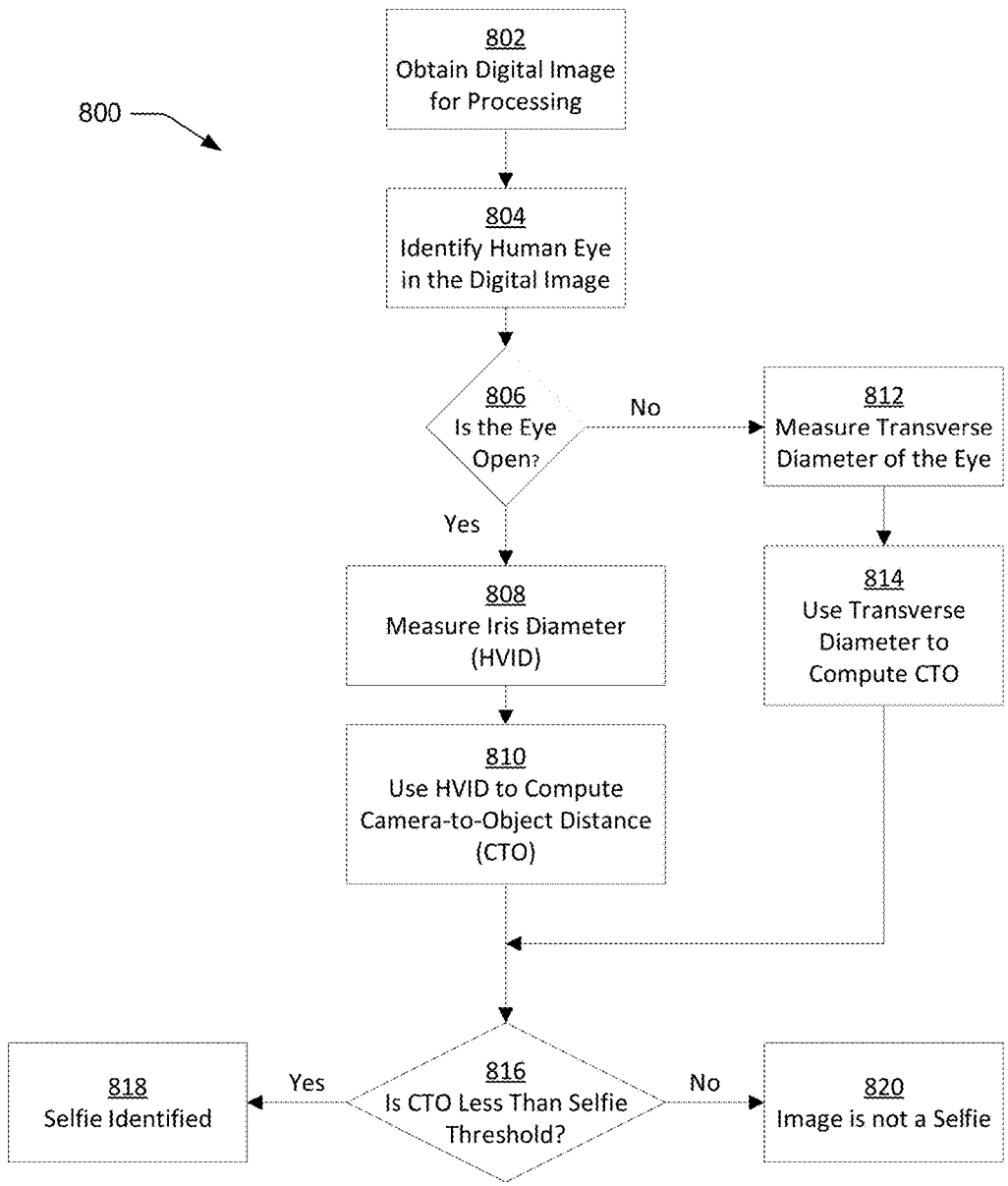
FIG. 8 is a flow diagram that describes details of an example procedure for computing camera-to-object distance and classifying digital images in accordance with one or more implementations.
Figure 9:
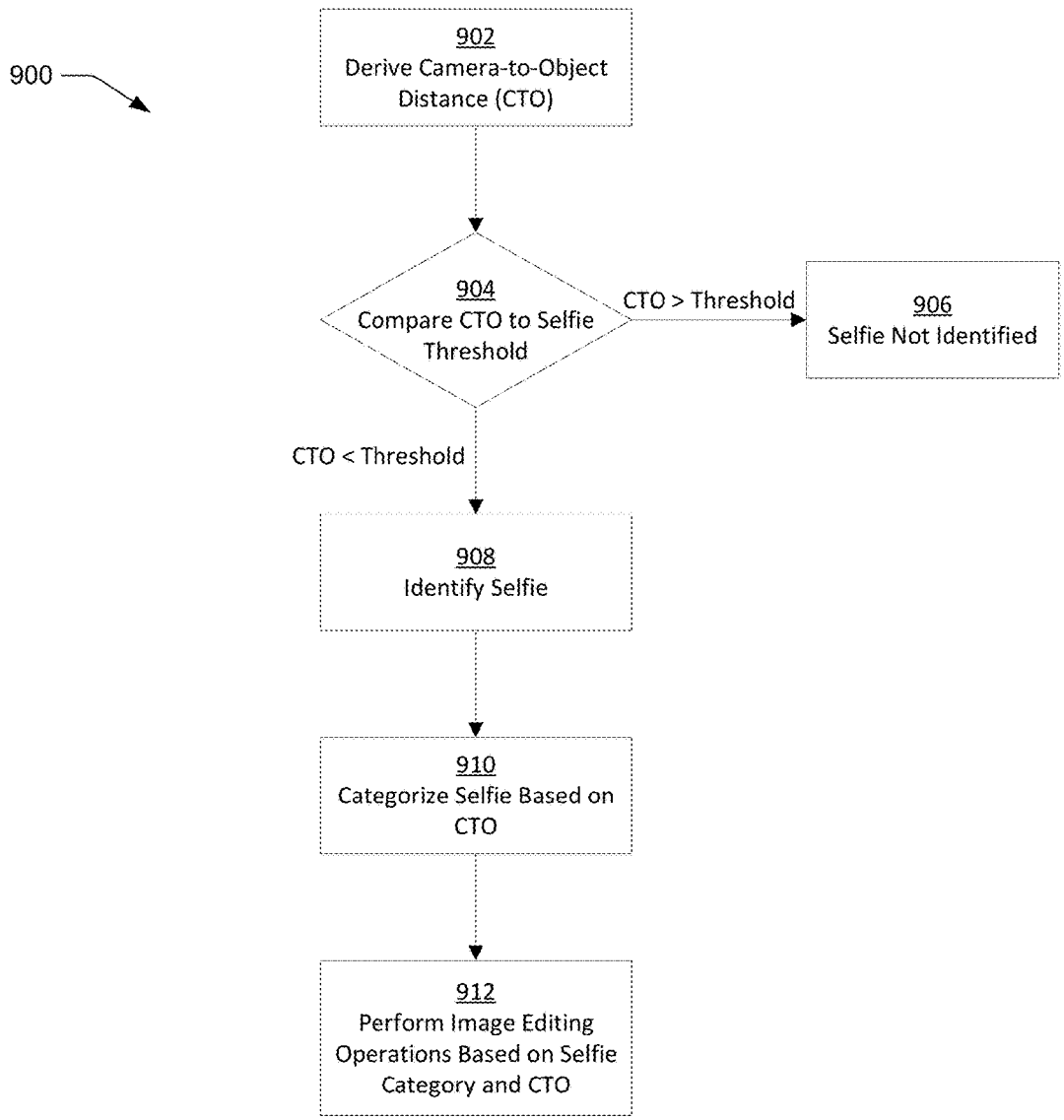
FIG. 9 is a flow diagram that describes details of an example procedure for identifying selfies in accordance with one or more implementations.

This section discusses additional aspects of classifying images based on calculated camera-to-object distance in relation to example procedures of FIG. 8 and FIG. 9. The procedures described in this document may be implemented utilizing the environment, system, devices, and components described herein and in connection with any suitable hardware, software, firmware, or combination thereof. The procedures are represented as a set of blocks that specify operations performed by one or more entities and are not necessarily limited to the orders shown for performing the operations by the respective blocks.

FIG. 8 is a flow diagram which describes details of an example procedure 800 for classifying images based on calculated camera-to-object distance. The procedure 800 can be implemented by way of a suitably configured computing device, such as by way of image editing application 108, CTO module 110, and/or other functionality described in relation to the examples of FIGS. 1-6. Individual operations and details discussed in relation to procedure 800 may also be combined in various ways with operations and details discussed herein in relation to the example procedures of FIGS. 4 and 9.

A digital image is obtained for processing, such as by an image processing application (block 802). Digital images may be obtained in a number of ways according to the device that captured the image and the device that will process the image, examples of which are provided above. One example includes capturing the digital image on a compact digital camera, followed by a PC computer obtaining the digital image for processing. Another example includes capturing the image using a smartphone camera, where the smartphone is to perform the processing of the digital image. Other examples of obtaining a digital image for processing are also contemplated, such as transferring images from various computer-readable media or downloading images from a web-based service or remote storage location over a network.

Human eyes are identified in the digital image (block 804). Human eyes may be identified using the techniques described above in relation to feature identifier 202, or other suitable techniques for identifying features within an image. For example, feature identifier 202 may operate to identify human faces within the digital image, and/or identify eyes and other features within the human faces using known facial recognition techniques.

A determination is made as to whether the eyes identified in the digital image are open (block 806). To do so, a feature identifier such as feature identifier 202 may use methods such as edge detection or Hough transform to determine whether eyes identified in the digital image are open or closed. One example of determining whether eyes are open or closed is through feature detection of an iris of the human eye. If an iris is detected, then the feature identifier 202 determines that the eye is open. If an iris is not detected, then the feature identifier 202 determines that the eye is closed. Any suitable feature detection algorithms and techniques may be utilized to determine whether eyes identified within a digital image are open or closed.

When the eyes in the digital image are open, the HVID is used to measure the iris diameter of the eyes (block 808). In this case, measurement of the HVID may be done manually by a user, such as by using the Ruler tool in Photoshop™. In implementations, measurement of the HVID may alternatively performed automatically using functionality integrated with an image editing application 108. When performed automatically, measurement of the HVID may rely upon feature identifier 202 to determine an outer edge of the iris so that the HVID can then be accurately detected and measured. In addition, as discussed previously in relation to FIG. 6, the HVID may be calculated as the Pythagorean hypotenuse of a projected right triangle when the HVID does not lie upon an axis of a two-dimensional Cartesian system. In one or more implementations, the HVID is measured in pixels, or measured and converted to pixels, and then substituted into Equation 1 or Equation 3 to compute CTO.

Once the HVID measurement is obtained, the HVID measurement is used to compute a camera-to-object distance (block 810). To do so, the HVID measurement is compared to a known dimension of the HVID in real life. In particular, the ratio of the known dimension of the HVID to the measured size (in pixels or other units) is determined and used to compute the CTO. As discussed above, the HVID is substantially constant for all humans and has little variance with age and ethnicity. An HVID constant of 11.8 mm is applicable to a majority of human subjects, and variance from this average value in human subjects is minimal, making it a reliable indicator for calculating camera-to-object distance. Substituting 11.8 mm as the Real height of object (mm) in Equation 1 for computing camera-to-object distance results in Equation 3. The measured HVID obtained per block 808 is used along with values for the focal length 312, image height 308, and sensor height 306 obtained from metadata associated with the digital image (or otherwise) to calculate camera-to-object distance in accordance with Equation 3. Thus, in this example the camera-to-object distance is dependent upon the ratio of the digital size of the dimension of the HVID to the corresponding HVID constant value.

While 11.8 mm is provided as an example real height of the HVID, other real height measurements may also be used. For example, additional significant figures may be added to the constant to provide a more accurate average value of HVID for human subjects. In addition or alternatively, the HVID average value may be modified over time based upon collection of real-time data, and thus updated dynamically to reflect a more accurate value. In implementations, a range of values for average HVID dimensions may be established for use in Equation 3. When a range of values is used, different values may be selected for use in different scenarios based on criteria such as location of the photo, age analysis of subjects in the image, user settings, and so forth. For example, a range of 11.6 mm to 12.0 mm incorporates about fifty percent of measured HVID dimensions for humans. An expanded range of 10.2 mm to 13.0 mm encompasses the HVID dimension of nearly all humans.

Returning to block 806, when it is determined that the identified human eye is not open in the digital image, the transverse diameter of the eye is measured (block 812). As discussed above, the transverse diameter of the human eye—from the lacrimal sac to the other extremity of the eyelid—can be measured with the eye open or shut. Therefore, for pictures of human subjects with their eyes shut, the transverse diameter may be utilized for the determination of camera-to-object distance. Again, measurement of the transverse diameter may performed manually by a user, such as by using the Ruler tool in Photoshop™. Measurement of the transverse diameter may also be performed automatically using functionality integrated with the image editing application 108. When performed automatically, measurement of the transverse diameter may rely upon feature identifier 202 to determine a lacrimal sac and the respective other extremity of the eyelid so that the transverse diameter can then be accurately detected and measured. As with the HVID, the transverse diameter may also be calculated as the Pythagorean hypotenuse of a projected right triangle when the transverse diameter does not lie upon an axis of a two-dimensional Cartesian system. The transverse diameter (and any other reference features) may be measured in pixels or other suitable units corresponding to the particular camera to object distance formula.

Once the transverse diameter measurement is obtained, the transverse diameter measurement is used to compute a camera-to-object distance (block 814). As noted previously, the computation relies in part upon a ratio of the known size of the transverse diameter in real life to the measured value for the transverse diameter in the image. As mentioned previously, the transverse diameter of the human eye is substantially constant in adults across ethnicities, as well as between adults and children. A transverse diameter constant of 24.2 mm is applicable to a majority of human subjects, and variance from this average value in human subjects is minimal, making it a reliable indicator for calculating camera-to-object distance. Substituting 24.2 mm as the Real height of object (mm) in Equation 1 for computing camera-to-object distance produces Equation 4. The measured transverse diameter obtained at block 812 is used along with the focal length 312, image height 308, and sensor height 306 obtained from metadata associated with the digital image (or otherwise) to compute camera-to-object distance in accordance with Equation 3. In this example, the camera-to-object distance is dependent upon the ratio of the digital size of the dimension of the transverse diameter to the corresponding transverse diameter constant.

While 24.2 mm is provided as an example real height of the transverse diameter, other values may also be used. For example, the number of significant figures used for the constant may adjusted depending upon the usage scenario. In addition or alternatively, the transverse diameter average value may be modified upon further data collection, and thus be updated to reflect a more accurate value. Still further, a range of values for average transverse diameter dimensions may be employed with Equation 4, in which case different values may be selected situationally based on criteria such as location, age of subjects, user settings, and so forth.

Note that it is common to have more than one pair of eyes present in a digital image. In implementations, operations discuss in relation to steps 802 through 814 may be applied to multiple eyes identified within the digital image, including eyes of different subjects. In this approach, a mean, median, or another appropriate statistical value derived from analysis of the multiple eyes may be taken as the measured dimension and used to determine the camera-to-object distance for the digital image. In another approach, the largest or smallest sized eye in the image, measured in pixels, are detected and used for the determination of camera-to-object distance. In another example, the feature detector 202 is configured to detect arm positioning in the digital image and obtain indications regarding who in the digital image is the photographer of the digital image. Once the photographer is identified, the eyes of the photographer may be selected and used for the calculation of the camera-to-object distance.

As reflected by the example procedure depicted in FIG. 8, in one or more implementations, the HVID may be used as a primary parameter for calculating camera-to-object distance because of the ease of detection and available technology for identifying the iris using image analysis and feature detection. In this approach, the transverse diameter is considered a secondary parameter since it is somewhat more difficult to detect and measure. Nonetheless, the transverse diameter is varies little across age and ethnicity and is fully visible in photographs with eyes open or closed. Thus, the transverse diameter works well as a secondary parameter.

Naturally, various dimensions of the eye and other body parts may be used individually or in various combinations to implement the techniques describe herein. For example either of the HVID or transverse diameter may be used as the sole parameter in some scenarios. Additionally, both of the HVID and the transverse diameter may be measured for one eye or multiple eyes in a digital image to enable a more accurate determination of camera-to-object distance in some cases. Further, different reference features/object (e.g., other than dimensions related to human eyes) may be employed, including but not limited to using anatomical constants associated with various human features detectable within images.

After a camera-to-object distance is calculated, the calculated camera-to-object distance is compared to a threshold to determine whether the digital image is a selfie (block 816). One example of a threshold that may be used to determine if the digital image is a selfie is arm's length. As discussed previously, the camera-to-object distance generally is limited to the length of the arm in the absence of a help device, such as a selfie stick. Therefore, in implementations, a default value associated with arm's length may be established as the threshold, such as 700 mm. Of course, different threshold values are contemplated, and the threshold may be customized to a user based on age, gender, or other criteria. Additionally, the threshold may be configurable by a user to enable user specific setting of the threshold and adjustment of the threshold for different usage scenarios.

In conjunction with categorizing images as selfies, a determination may also be made regarding whether a selfie stick is used to take images. In implementations, analytical means can be used to detect whether a selfie stick is being used. A user may then be prompted to confirm the use of the selfie stick, and optionally input the length of the selfie stick. A user may also set preferences in advance to specify settings for selfie thresholds, selfie stick usage, image categorizations, and so forth. In implementations, metadata generator 114 of the camera 112 can generate a parameter indicating that a selfie stick is being used. This selfie-stick parameter may be used to override an arm's length default threshold and a categorization module can instead use an established threshold for selfie stick usage.

When the camera-to-object distance is less than the selfie threshold, the digital image is categorized as a selfie (block 818). On the other hand, when the camera-to-object distance is less than the selfie threshold, the image is categorized as not a selfie (block 820). In an implementation, indications regarding whether an image is a selfie or not are inserted into metadata associated with the image. For example, keywords made be added that relate to selfie categorizations or other categorizations based on CTO. In addition or alternatively, field or fields contained within metadata may be updated to reflect the selfie determination, such as by toggling a Boolean indicator on/off and storing the computed CTO values as metadata. These and other indications may be used by an image editing application to selectively apply image editing operations, or may be used to label or categorize digital images accordingly.

FIG. 9 is a flow diagram which describes details of an example procedure 900 for categorizing digital images as selfies in accordance with one or more implementations. The procedure 900 can be implemented by way of a suitably configured computing device, such as by way of image editing application 108, CTO module 110, and/or other functionality described in relation to the examples of FIGS. 1-6. Individual operations and details discussed in relation to procedure 800 may also be combined in various ways with operations and details discussed herein in relation to the example procedures of FIGS. 4 and 8.

A camera-to-object distance is derived (block 902). The camera-to-object distance may be calculated based on the examples provided in FIGS. 4 and 8, such as by measuring the HVID and/or transverse diameter of human eyes identified in a digital image and comparing these measurements to known, real-life dimensions of these features. The camera-to-object distance can be based upon a ratio of the measured dimension to the corresponding known, real-life dimension of a feature. In implementations, the camera-to-object distance is calculated using other features measured in the digital image and comparing the measurements to known dimensions of these features in real life. Additionally, the camera-to-object distance may be computed by a camera when images are taken via the camera and associated with images as metadata. In this case, camera-to-object distance may be obtained directly from metadata associated with the image. Other techniques for acquiring a camera-to-object distance are also contemplated.

The camera-to-object distance is compared to a threshold to determine if the digital image is a selfie (block 904). This determination may be based upon a default threshold, such as an arm's length of 700 mm. Other thresholds to determine if an image are a selfie are also considered, such as arm's lengths personalized to a user based on age, gender, or other characteristics, user input of a specific threshold, or another value for the threshold when a selfie stick is being used.

When it is determined that the camera-to-object distance is greater than the selfie threshold, the digital image is identified as not a selfie (block 906). However, if the camera-to-object distance is less than the selfie threshold, a selfie may be identified (block 908). These identifications may be used by image editing application 108 to perform image editing operations, or may be used to label or categorize digital images accordingly.

When the digital image has been identified as a selfie, the digital image may be further categorized based on the camera-to-object distance associated with the digital image, or other characteristics of the digital image (block 910). Then, an image editing application may use the categorizations to fine-tune image editing operations applied to the digital image (block 912). For example, using the camera-to-object distance, digital images may be further categorized based on how close the one or more subjects are to the camera that captured the digital image. By way of example and not limitation, selfies may be categorized as close selfies, mid-range selfies, and long-range selfies, details of which may be found in relation to FIG. 2

Other categorizations may also be applied to digital images based upon the selfie determination, camera-to-object distance, and/or other characteristics of the digital image. For example, multiple discernable sets of eyes in the digital image may be used to categorize the image as a group selfie. Upon determining that the image is a group selfie, measurements of other sets of eyes present in the digital image may be obtained in order to perform error correction in calculating camera-to-object distance or to correct errors within the digital image itself. Further, categorizing a selfie as a group selfie may allow an image editing application to be selective about which sets of eyes to perform further operations on, such as by selectively applying error correction of camera-to-object distance calculations using particular subjects in the group selfie.

Additionally, images may be categorized according to whether the digital image was taken with a selfie stick, whether it is day or night, whether the digital image was taken indoors or outdoors, relationships between subjects in the digital image, and so forth. These and other categorizations may be used to selectively perform image editing operations such as lens correction, removal of unwanted elements, perspective control, enhancement, sharpening and softening, and merging images, to name a few. Additionally, a collection of images may be managed and organized based on different categorizations. For example, a representation of images exposed via a user interface of an application may be viewable and filterable based on the categorizations. Further, images identified as selfies may be organize into one or more selfie specific folders or tabs that correspond to categorizations to facilitate user navigation and interaction with the image collection. Thus, the described techniques enables user to quickly find, share, and otherwise utilizes selfies with little or no effort. Additionally, selfies are automatically distinguished from other types of images based on CTO which enables various new ways of handling and processing images. For example, CTO may be used as a criteria to selectively apply and control different image editing operations, which can improve accuracy and efficiency of these operation and ultimately leads to increased user satisfaction.

Having described example details and procedures associated with classifying images based on calculated camera-to-object distance, consider now a discussion of an example system that can include or make use of these details and procedures in accordance with one or more implementations.

Example Device

Figure 10:
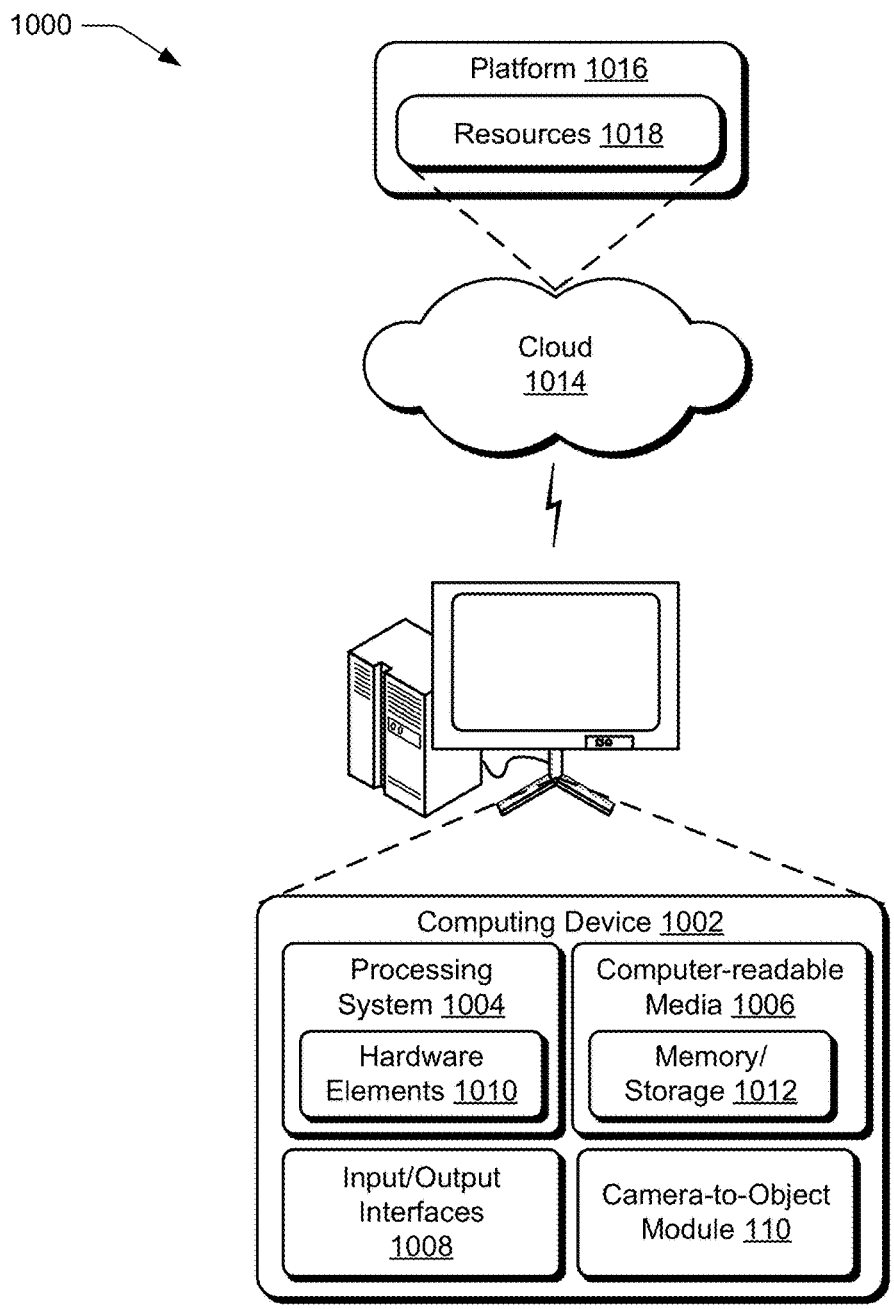
FIG. 10 is a block diagram of a system that can include or make use of a camera-to-object module in an image editing application in accordance with one or more implementations.

FIG. 10 illustrates an example system 1000 that includes an example computing device 1002 that is representative of one or more computing systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 1002, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the processing system 104, image editing application 108, camera-to-object module 110, and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer, mobile, and camera uses. Each of these configurations includes devices that may have generally different constructs and capabilities, and thus the computing device 1002 may be configured according to one or more of the different device classes. For instance, the computing device 1002 may be implemented as the computer class of a device that includes a personal computer, desktop computer, a multi-screen computer, laptop computer, netbook, and so on.

The computing device 1002 may also be implemented as the mobile class of device that includes mobile devices, such as a mobile phone, portable music player, portable gaming device, a tablet computer, a multi-screen computer, and so on. The computing device 1002 may also be implemented as the camera class of device that includes devices having or connected to a sensor and lens for capturing visual images. These devices include compact camera, action camera, bridge camera, mirrorless interchangeable-lens camera, modular camera, digital single-lens reflex (DSLR) camera, or digital single-lens translucent (DSLT) camera, and so on.

The techniques described herein may be supported by these various configurations of the computing device 1002 and are not limited to the specific examples of the techniques described herein. This is illustrated through inclusion of the camera-to-object module 110 on the computing device 1002. The functionality represented by camera-to-object module 110 and other modules/applications may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the example implementations have been described in language specific to structural features and/or methodological acts, it is to be understood that the implementations defined in the appended claims are not necessarily limited to the specific features or acts described. Rather, the specific features and acts are disclosed as example forms of implementing the claimed features.

The invention claimed is:

1. In a digital medium environment for determining a camera-to-object distance from features within a digital image in a digital image creation system, a system comprising:
   an image processing application implemented at least partially in hardware of a computing device to obtain the digital image for processing;
   a feature identifier implemented at least partially in hardware of the computing device to identify a particular feature contained in the digital image, the particular feature corresponding to a defined reference feature having known physical dimensions in real life, to identify the particular feature including determining whether the particular feature lies along an axis of a two-dimensional Cartesian system relative to the digital image;

a measurement module implemented at least partially in hardware of the computing device to measure a dimension of the particular feature that reflects a digital size of the particular feature within the digital image, the measurement module further configured to:

compute a Pythagorean hypotenuse of a projected right-angled triangle formed by the particular feature to use as the dimension of the particular feature responsive to determining that the particular feature does not lie along the axis; and a camera-to-object distance calculator implemented at least partially in hardware of the computing device to calculate a camera-to-object distance for the digital image based in part upon a ratio of the measured dimension of the particular feature and the known physical dimensions of the identified feature.

2. The system of claim 1, wherein the particular feature is a human iris, and wherein the known physical dimensions correspond to an established size for a diameter of the iris.

3. The system of claim 1, wherein the particular feature is a transverse diameter of a human eye, and wherein the known physical dimensions include a constant value established for the transverse diameter.

4. The system of claim 1, wherein the digital size of the particular feature is measured in pixels.

5. The system of claim 1, wherein to calculate the camera-to-object distance is further based upon a focal length of the camera, an image height of the digital image in pixels, and a sensor height of the camera.

6. The system of claim 5, wherein the focal length, the image height, and the sensor height are obtained from metadata embedded with the digital image when the image is captured.

7. The system of claim 5, wherein the camera-to-object distance is calculated by multiplying the focal length by an object height and the image height and dividing the result by the object height multiplied by the sensor height.

8. The system of claim 1, wherein the particular feature includes an iris or a transverse diameter of an eye.

9. In a digital image editing environment, a computer-implemented method for determining a camera-to-object distance from features within a digital image comprising:

obtaining the digital image for processing via an image processing application;

identifying a particular feature contained in the digital image, the particular feature corresponding to a defined reference feature having known physical dimensions in real life;

measuring a dimension of the particular feature that reflects a digital size of the particular feature within the digital image;

computing a camera-to-object distance for the digital image based in part upon a ratio of the measured dimension of the particular feature and the known physical dimensions of the identified feature;

comparing the camera-to-object distance to a threshold distance established to facilitate categorization of images as selfies or non-selfies; and categorizing the digital image as a selfie when the camera-to-object distance is below the threshold.

10. The method of claim 9, wherein the particular feature is a human iris, and wherein the known physical dimensions correspond to an established size for a diameter of the iris.

11. The method of claim 9, wherein the particular feature is a transverse diameter of a human eye, and wherein the known physical dimensions include a constant value established for the transverse diameter.

12. The method of claim 9, wherein the digital size of the particular feature is measured in pixels.

13. The method of claim 9, wherein the computing the camera-to-object distance is further based upon a focal length of the camera, an image height of the digital image in pixels, and a sensor height of the camera.

14. The method of claim 13, wherein the focal length, the image height, and the sensor height are obtained from metadata embedded with the digital image when the image is captured.

15. The method of claim 13, wherein the camera-to-object distance is calculated by multiplying the focal length by an object height and the image height and dividing the result by the object height multiplied by the sensor height.

16. In a digital image editing environment, a computer-implemented method for determining a camera-to-object distance from features within a digital image comprising:

obtaining a digital image for processing via an image processing application;

recognizing inclusion of one or more human faces within the digital image;

calculating a digital size that corresponds to a dimension of an eye in at least one of the human faces recognized within the digital image;

applying a camera-to-object distance formula to derive a camera-to-object distance for the digital image, the camera-to-object distance formula dependent upon a ratio of the digital size calculated for the dimension of the eye to a corresponding pre-defined constant value for the dimension of the eye;

selectively performing one or more image editing operations to process the digital image based in part upon the camera-to-object distance derived for the image;

comparing the camera-to-object distance to a threshold distance established to facilitate categorization of images as selfies or non-selfies; and categorizing the digital image as a selfie when the camera-to-object distance is below the threshold.

17. The method of claim 16, wherein the dimension of the eye relates to an iris or a transverse diameter of the eye.

18. The method of claim 16, wherein to derive the camera-to-object distance is further based upon a focal length of the camera, an image height of the digital image in pixels, and a sensor height of the camera.

19. The method of claim 16, wherein the digital size is measured in pixels.

20. The method of claim 16, further comprising determining image editing operations associated with images categorized as selfies.

* * * * *